United States Patent
Floess et al.

(10) Patent No.: US 8,202,502 B2
(45) Date of Patent: Jun. 19, 2012

(54) METHOD OF PREPARING HYDROPHOBIC SILICA

(75) Inventors: Joachim K. Floess, Urbana, IL (US); William R. Williams, Reading, MA (US); Dmitry Fomitchev, Lexington, MA (US)

(73) Assignee: Cabot Corporation, Boston, MA (US)

( * ) Notice: Subject to any disclaimer, the term of this patent is extended or adjusted under 35 U.S.C. 154(b) by 268 days.

(21) Appl. No.: 11/774,133

(22) Filed: Jul. 6, 2007

(65) Prior Publication Data
US 2008/0069753 A1    Mar. 20, 2008

Related U.S. Application Data

(60) Provisional application No. 60/844,828, filed on Sep. 15, 2006.

(51) Int. Cl.
*C01B 33/12* (2006.01)
(52) U.S. Cl. ............... 423/335; 428/405; 106/287.12; 106/287.16
(58) Field of Classification Search .................. 423/335; 428/405; 106/287.12, 287.16
See application file for complete search history.

(56) References Cited

U.S. PATENT DOCUMENTS

| | | |
|---|---|---|
| 4,845,004 A | 7/1989 | Kobayashi |
| 4,923,520 A | 5/1990 | Anzai et al. |
| 4,943,507 A | 7/1990 | Takahashi et al. |
| 4,950,502 A | 8/1990 | Saam et al. |
| 4,985,477 A | 1/1991 | Collins et al. |
| 5,008,305 A | 4/1991 | Kennan et al. |
| 5,009,874 A | 4/1991 | Parmentier et al. |
| 5,013,585 A | 5/1991 | Shimizu et al. |
| 5,024,915 A | 6/1991 | Sato et al. |
| 5,039,736 A | 8/1991 | Fujiki |
| 5,096,733 A | 3/1992 | Vallyathan et al. |
| 5,135,832 A | 8/1992 | Sacripante et al. |
| 5,194,356 A | 3/1993 | Sacripante et al. |
| 5,226,930 A | 7/1993 | Sasaki |
| 5,266,432 A | 11/1993 | Hayashi et al. |
| 5,320,925 A | 6/1994 | Imai et al. |
| 5,376,172 A | 12/1994 | Tripp et al. |

(Continued)

FOREIGN PATENT DOCUMENTS

DE    196 16 781 A1    11/1997

(Continued)

OTHER PUBLICATIONS

Maciel et al., "Silicon-29 NMR study of the surface of silica gel by cross polarization and magic-angle spinning," *J. Am. Chem. Soc.*, 102 (25): 7606-7607 (Dec. 3, 1980).

(Continued)

*Primary Examiner* — Melvin C Mayes
*Assistant Examiner* — Melissa Stalder

(57) ABSTRACT

The invention provides hydrophobic surface-treated silica particles having (1) a ratio T2:T3 of about 0.4 or more, wherein T2 is the intensity of a peak having a chemical shift in the CP/MAS $^{29}$Si NMR spectrum centered within the range of −56 ppm to −59 ppm, and wherein T3 is the intensity of a peak having a chemical shift in the CP/MAS $^{29}$Si NMR spectrum centered within the range of −65 ppm to −69 ppm, and (2) a ratio (T2+T3)/(T2+T3+M) of greater than about 0.05, wherein M is the intensity of a peak having a chemical shift in the CP/MAS $^{29}$Si NMR spectrum centered within the range of +7 ppm to +18 ppm. The invention also provides a method of preparing hydrophobic surface-treated silica particles.

31 Claims, 1 Drawing Sheet

Particle Size Distribution for Example 3

U.S. PATENT DOCUMENTS

| | | | |
|---|---|---|---|
| 5,415,936 A | 5/1995 | Deusser et al. | |
| 5,422,214 A | 6/1995 | Akiyama et al. | |
| 5,424,161 A | 6/1995 | Hayashi et al. | |
| 5,475,044 A * | 12/1995 | Stein | 524/188 |
| 5,480,755 A | 1/1996 | Uchiyama et al. | |
| 5,531,929 A | 7/1996 | Kobayashi | |
| 5,543,173 A | 8/1996 | Horn, Jr. et al. | |
| 5,597,853 A | 1/1997 | Itoh et al. | |
| 5,651,921 A | 7/1997 | Kaijou | |
| 5,665,156 A | 9/1997 | Ettlinger et al. | |
| 5,665,511 A | 9/1997 | Imai et al. | |
| 5,686,054 A | 11/1997 | Barthel et al. | |
| 5,711,797 A | 1/1998 | Ettlinger et al. | |
| 5,716,748 A | 2/1998 | Hasegawa et al. | |
| 5,725,987 A | 3/1998 | Combes et al. | |
| 5,747,211 A | 5/1998 | Hagi et al. | |
| 5,766,814 A | 6/1998 | Baba et al. | |
| 5,776,240 A | 7/1998 | Deller et al. | |
| 5,776,646 A | 7/1998 | Hagi et al. | |
| 5,824,442 A | 10/1998 | Tanikawa et al. | |
| 5,824,739 A | 10/1998 | Kondo et al. | |
| 5,827,632 A | 10/1998 | Inaba et al. | |
| 5,840,287 A * | 11/1998 | Guskey et al. | 424/65 |
| 5,843,525 A | 12/1998 | Shibasaki et al. | |
| 5,849,451 A | 12/1998 | Ishihara et al. | |
| 5,900,315 A | 5/1999 | Little | |
| 5,902,635 A | 5/1999 | Garafalo et al. | |
| 5,908,660 A | 6/1999 | Griffith et al. | |
| 5,919,298 A | 7/1999 | Griffith et al. | |
| 5,942,590 A | 8/1999 | Burns et al. | |
| 5,959,005 A | 9/1999 | Hartmann et al. | |
| 5,969,023 A | 10/1999 | Enami et al. | |
| 5,989,768 A | 11/1999 | Little | |
| 6,004,711 A | 12/1999 | Bourne et al. | |
| 6,004,714 A | 12/1999 | Ciccarelli et al. | |
| 6,015,843 A | 1/2000 | Van Vlasselaer et al. | |
| 6,025,455 A * | 2/2000 | Yoshitake et al. | 528/10 |
| 6,045,650 A | 4/2000 | Mitchnick et al. | |
| 6,051,672 A | 4/2000 | Burns et al. | |
| 6,066,421 A | 5/2000 | Julien et al. | |
| 6,077,640 A | 6/2000 | Komai et al. | |
| 6,086,668 A | 7/2000 | Farneth et al. | |
| 6,087,059 A | 7/2000 | Duggan et al. | |
| 6,103,441 A | 8/2000 | Tomita et al. | |
| 6,107,351 A | 8/2000 | Burns et al. | |
| 6,165,663 A | 12/2000 | Baba et al. | |
| 6,180,076 B1 | 1/2001 | Uhrlandt et al. | |
| 6,183,867 B1 | 2/2001 | Barthel et al. | |
| 6,184,408 B1 * | 2/2001 | Burns et al. | 556/450 |
| 6,190,815 B1 | 2/2001 | Ciccarelli et al. | |
| 6,191,122 B1 | 2/2001 | Lux et al. | |
| 6,193,795 B1 | 2/2001 | Nargiello et al. | |
| 6,197,384 B1 | 3/2001 | Schubert et al. | |
| 6,197,470 B1 | 3/2001 | Tamura | |
| 6,203,960 B1 | 3/2001 | Ciccarelli et al. | |
| 6,214,507 B1 | 4/2001 | Sokol et al. | |
| 6,242,147 B1 | 6/2001 | Anno et al. | |
| 6,248,495 B1 | 6/2001 | Inokuchi et al. | |
| 6,255,373 B1 | 7/2001 | Akamatsu et al. | |
| 6,270,937 B2 | 8/2001 | Yuasa et al. | |
| 6,287,739 B1 | 9/2001 | Kawakami et al. | |
| 6,294,303 B1 | 9/2001 | Putnam et al. | |
| 6,312,861 B1 | 11/2001 | Ciccarelli et al. | |
| 6,316,155 B1 | 11/2001 | Kudo et al. | |
| 6,318,124 B1 * | 11/2001 | Rutherford et al. | 65/60.8 |
| 6,319,647 B1 | 11/2001 | Gutman et al. | |
| 6,335,139 B1 | 1/2002 | Gambayashi et al. | |
| 6,376,077 B1 | 4/2002 | Hiraishi et al. | |
| 6,379,856 B2 | 4/2002 | Sokol et al. | |
| 6,384,125 B1 | 5/2002 | Bergstrom et al. | |
| 6,403,271 B1 | 6/2002 | Suzuki et al. | |
| 6,420,456 B1 | 7/2002 | Koski | |
| 6,448,331 B1 * | 9/2002 | Ioka et al. | 524/859 |
| 6,465,670 B2 | 10/2002 | Thise et al. | |
| 6,479,206 B1 | 11/2002 | Suzuki et al. | |
| 6,489,075 B2 | 12/2002 | Suzuki et al. | |
| 6,503,677 B1 | 1/2003 | Gutman et al. | |
| 6,521,290 B1 * | 2/2003 | Kudo et al. | 427/214 |
| 6,555,282 B2 | 4/2003 | Okuno et al. | |
| 6,573,018 B2 | 6/2003 | Ishibashi et al. | |
| 6,579,929 B1 | 6/2003 | Cole et al. | |
| 6,589,703 B2 | 7/2003 | Stelter et al. | |
| 6,610,777 B1 | 8/2003 | Anderson et al. | |
| 6,613,491 B2 | 9/2003 | Inoue et al. | |
| 6,657,001 B1 | 12/2003 | Anderson et al. | |
| 6,677,095 B2 | 1/2004 | Murota et al. | |
| 6,686,110 B2 | 2/2004 | Kadota | |
| 6,696,212 B2 | 2/2004 | Marsh et al. | |
| 6,706,398 B1 | 3/2004 | Revis | |
| 6,706,457 B2 | 3/2004 | Koumura | |
| 6,736,891 B1 | 5/2004 | Bice et al. | |
| 6,780,559 B2 | 8/2004 | Veregin et al. | |
| 6,800,413 B2 | 10/2004 | Barthel et al. | |
| 6,803,408 B2 | 10/2004 | Anderson et al. | |
| 6,811,856 B2 | 11/2004 | Nun et al. | |
| 6,830,811 B2 * | 12/2004 | Chao | 428/405 |
| 6,840,992 B2 | 1/2005 | Glaum et al. | |
| 6,855,759 B2 | 2/2005 | Kudo et al. | |
| 6,890,657 B2 | 5/2005 | Pickering et al. | |
| 6,899,948 B2 | 5/2005 | Zhang et al. | |
| 6,899,951 B2 | 5/2005 | Panz et al. | |
| 6,972,301 B2 | 12/2005 | Hurlburt et al. | |
| 7,014,969 B2 | 3/2006 | Yachi et al. | |
| 7,014,975 B2 | 3/2006 | Barthel et al. | |
| 7,022,375 B2 | 4/2006 | Schachtely et al. | |
| 7,081,234 B1 | 7/2006 | Qi et al. | |
| 7,083,770 B2 | 8/2006 | Shibasaki et al. | |
| 7,169,832 B2 | 1/2007 | Poppe et al. | |
| 7,186,440 B2 | 3/2007 | Yoshitake et al. | |
| 7,238,387 B2 | 7/2007 | Ogawa et al. | |
| 7,252,885 B2 | 8/2007 | Pickering et al. | |
| 7,300,734 B2 | 11/2007 | McDougall et al. | |
| 7,312,009 B2 | 12/2007 | Lee et al. | |
| 7,316,881 B2 | 1/2008 | Rimai et al. | |
| 7,341,625 B2 | 3/2008 | Amirzadeh-Asl | |
| 7,713,326 B2 | 5/2010 | Carstens et al. | |
| 2002/0037936 A1 | 3/2002 | Michael et al. | |
| 2003/0035888 A1 | 2/2003 | Eriyama et al. | |
| 2003/0082090 A1 | 5/2003 | Blume et al. | |
| 2004/0077768 A1 | 4/2004 | Greenwood | |
| 2004/0102529 A1 | 5/2004 | Campbell et al. | |
| 2004/0138343 A1 | 7/2004 | Campbell et al. | |
| 2005/0011409 A1 | 1/2005 | Isobe | |
| 2005/0014894 A1 * | 1/2005 | Flannigan et al. | 524/864 |
| 2005/0026060 A1 | 2/2005 | Ogawa et al. | |
| 2005/0026087 A1 | 2/2005 | Keller | |
| 2005/0026089 A1 | 2/2005 | Ogawa et al. | |
| 2005/0089353 A1 | 4/2005 | Pickering et al. | |
| 2005/0095521 A1 | 5/2005 | Rimai et al. | |
| 2005/0095522 A1 | 5/2005 | Goebel et al. | |
| 2005/0147908 A1 | 7/2005 | Yamane et al. | |
| 2005/0154124 A1 | 7/2005 | Yoshitake et al. | |
| 2005/0170109 A1 | 8/2005 | Chen et al. | |
| 2005/0187334 A1 | 8/2005 | Blume et al. | |
| 2005/0203214 A1 | 9/2005 | Amano et al. | |
| 2005/0241531 A1 | 11/2005 | Meyer et al. | |
| 2006/0041035 A1 | 2/2006 | Poppe et al. | |
| 2006/0062941 A1 | 3/2006 | Bi et al. | |
| 2006/0084746 A1 | 4/2006 | Bice et al. | |
| 2006/0099129 A1 | 5/2006 | Stenzel et al. | |
| 2006/0112860 A1 * | 6/2006 | Yoshitake et al. | 106/490 |
| 2006/0115405 A1 | 6/2006 | Konya et al. | |
| 2006/0121381 A1 | 6/2006 | McDougall et al. | |
| 2006/0121382 A1 | 6/2006 | Choi et al. | |
| 2006/0127787 A1 | 6/2006 | Lee et al. | |
| 2006/0150527 A1 | 7/2006 | Ohara et al. | |
| 2006/0160008 A1 | 7/2006 | Lee et al. | |
| 2006/0171872 A1 | 8/2006 | Adams | |
| 2006/0178451 A1 | 8/2006 | Weller | |
| 2006/0188722 A1 | 8/2006 | White et al. | |
| 2006/0225615 A1 | 10/2006 | Raman et al. | |
| 2006/0281009 A1 | 12/2006 | Boyer et al. | |
| 2007/0009823 A1 | 1/2007 | Skorokhod et al. | |
| 2007/0048643 A1 | 3/2007 | Kmiecik-Lawrynowicz et al. | |
| 2007/0148577 A1 | 6/2007 | Ogawa et al. | |

| | | | |
|---|---|---|---|
| 2008/0070140 A1 | 3/2008 | Fomitchev et al. | |
| 2008/0070143 A1 | 3/2008 | Fomitchev et al. | |
| 2008/0070146 A1 | 3/2008 | Fomitchev et al. | |

FOREIGN PATENT DOCUMENTS

| | | |
|---|---|---|
| EP | 0 371 147 B1 | 6/1990 |
| EP | 0 694 576 A1 | 1/1996 |
| EP | 0 704 769 A1 | 5/1996 |
| EP | 0 982 268 A1 | 3/2000 |
| EP | 1 559 750 A2 | 8/2005 |
| EP | 1 580 019 A1 | 9/2005 |
| EP | 1 559 750 A3 | 10/2005 |
| EP | 1 591 490 A2 | 11/2005 |
| EP | 1 657 283 A1 | 5/2006 |
| EP | 1696006 A1 * | 8/2006 |
| JP | 58-216252 A | 12/1983 |
| JP | 62-227160 A | 10/1987 |
| JP | 3-187913 A | 8/1991 |
| JP | 4-106184 A | 4/1992 |
| JP | 04-269763 A | 9/1992 |
| JP | 6-100313 A | 4/1994 |
| JP | 06-194863 A | 7/1994 |
| JP | 06-242630 A | 9/1994 |
| JP | 07-064318 A | 3/1995 |
| JP | 7-187647 A | 7/1995 |
| JP | 08-095285 A | 4/1996 |
| JP | 8-245835 A | 9/1996 |
| JP | 10-25427 A | 1/1998 |
| JP | 10-36705 A | 2/1998 |
| JP | 2000-044226 A | 2/2000 |
| JP | 2000-258955 A | 9/2000 |
| JP | 2001-031843 A | 2/2001 |
| JP | 2001-097710 A | 4/2001 |
| JP | 2002-146233 A | 5/2002 |
| JP | 2002-244340 A | 8/2002 |
| JP | 2002-256170 A | 9/2002 |
| JP | 2002-275356 A | 9/2002 |
| JP | 2002-338230 A | 11/2002 |
| JP | 2003-137528 A | 5/2003 |
| JP | 2003-201112 A | 7/2003 |
| JP | 2003-238141 A | 8/2003 |
| JP | 2004-029699 A | 1/2004 |
| JP | 2004-168559 A | 6/2004 |
| JP | 2004-258265 A | 9/2004 |
| JP | 2005-215491 A | 8/2005 |
| JP | 2006-053458 A | 2/2006 |
| JP | 2006-096641 A | 4/2006 |
| JP | 2006-171017 A | 6/2006 |
| JP | 2007-034223 A | 2/2007 |
| JP | 2007-034224 A | 2/2007 |
| WO | WO 2005/095525 A1 | 10/2005 |
| WO | WO 2006/045012 A2 | 4/2006 |
| WO | WO 2006/053632 A2 | 5/2006 |
| WO | WO 2006/116887 A1 | 11/2006 |
| WO | WO 2007/013388 A1 | 2/2007 |

OTHER PUBLICATIONS

Sindorf et al., "Cross-polarization/magic-angle spinning silicon-29 nuclear magnetic resonance study of silica gel using trimethylsilane bonding as a probe of surface geometry and reactivity," *J. Phys. Chem.*, 86 (26): 5208-5219 (Dec. 23, 1982).

Sindorf et al., "Solid-state NMR studies of the reactions of silica surfaces with polyfunctional chloromethylsilanes and ethoxymethylsilanes," *J. Am. Chem. Soc.*, 105 (12): 3767-3776 (Jun. 15, 1983).

Yoshida, "Silica nucleation, polymerization, and growth preparation of monodispersed sols," in *Coloidal Silica: Fundamentals and Applications* (Bergna et al., eds.), Chapter 6, 47-56 (CRC Press, an imprint of the Taylor & Francis Group, Boca Raton, Florida, 2006).

Chen et al., *Journal of Colloid and Interface Science*, 281: 339-350 (2005).

International Preliminary Report on Patentability with respect to PCT/US2008/008287 (Jan. 21, 2010).

International Preliminary Report on Patentability with respect to PCT/US2008/008292 (Jan. 21, 2010).

International Preliminary Report on Patentability with respect to PCT/US2008/008293 (Jan. 21, 2010).

Evonik Industries, AEROSIL Product Overview (Evonik Degussa GmbH, 2009).

European Patent Office, International Search Report in International Patent Application No. PCT/US2007/020007 (Mar. 6, 2008).

European Patent Office, International Search Report in International Patent Application No. PCT/US2008/008287 (Oct. 21, 2008).

European Patent Office, International Search Report in International Patent Application No. PCT/US2008/008292 (Nov. 14, 2008).

European Patent Office, International Search Report in International Patent Application No. PCT/US2008/008293 (Oct. 21, 2008).

European Patent Office, International Preliminary Report on Patentability in International Patent Application No. PCT/US2007/020007 (Mar. 17, 2009).

Caravajal et al., "Structural Characterization of (3-Aminopropyl)triethoxysilane-Modified Silicas by Silicon-29 and Carbon-13 Nuclear Magnetic Resonance," *Analytical Chemistry*, 60(17): 1776-1786 (Sep. 1, 1988).

Garcia et al., "Use of *p*-Toluenesulfonic Acid for the Controlled Grafting of Alkoxysilanes onto Silanol Containing Surfaces: Preparation of Tunable Hydrophillic, Hydrophobic, and Super-Hydrophobic Silica," *J. Am. Chem. Soc.*, 129: 5052-5060 (2007).

\* cited by examiner

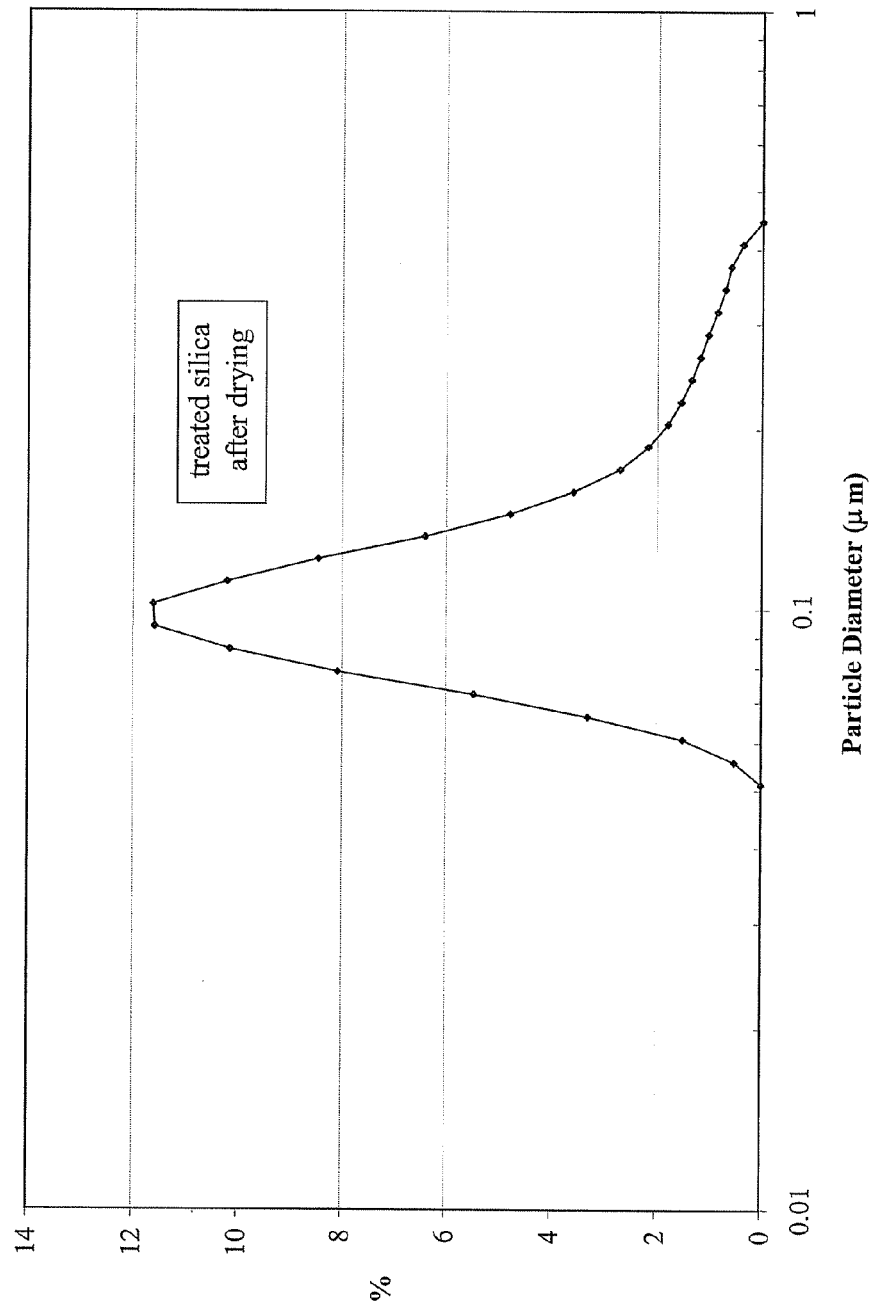

METHOD OF PREPARING HYDROPHOBIC SILICA

CROSS-REFERENCE TO RELATED APPLICATIONS

This patent application claims the benefit of U.S. Provisional Patent Application No. 60/844,828, filed Sep. 15, 2006.

FIELD OF THE INVENTION

The invention pertains to hydrophobic silica particles and methods for preparing the same.

BACKGROUND OF THE INVENTION

Hydrophobic silica particles possess physical properties that are useful in a number of applications requiring a high degree of dispersibility, including use in toner compositions, as antiblocking agents, as adhesion modifiers, and as polymer fillers. Untreated silica particles are hydrophilic due to the presence of silanol groups on the surface of the untreated silica particles. By treating hydrophilic silica particles, the hydrophilic nature of the silica particles can be reduced, thereby imparting varying degrees of hydrophobicity to the particles.

Many different methods are known for treating the surface of silica particles. Frequently, aqueous dispersions of silica particles are treated with reagents to introduce hydrophobic functional groups onto the silica surface. In order to prevent condensation of the silica particles into gels or large agglomerates, the aqueous dispersions of silica particles are typically stabilized by control of the pH. Prior art processes typically utilize basic aqueous dispersions of silica particles, wherein stability is maintained at a basic pH. However, the pH of the aqueous silica dispersions affects the surface chemistry of the silica particles in reaction with treating agents and limits the type of modifications possible at the particle surface. European Patent Application Publication EP 1657283A1 describes the surface treatment of acidic aqueous dispersions of silica particles with a silazane and optionally with a combination of a silazane and a siloxane. However, such a process limits the surface treatment of the silica particles to introduction of a single type of functional group, namely, a trimethylsilyl group.

BRIEF SUMMARY OF THE INVENTION

The invention provides a method of preparing hydrophobic silica particles comprising (a) providing an acidic aqueous dispersion of silica, (b) combining the dispersion with an alkcoxysilane compound to provide a reaction mixture, and (c) drying the reaction mixture to provide hydrophobic silica particles.

The invention also provides hydrophobic silica particles produced by a process comprising (a) providing an acidic aqueous dispersion of silica, (b) combining the dispersion with an alkoxysilane compound to provide a reaction mixture, and (c) drying the reaction mixture to provide hydrophobic silica particles, wherein a solid-state Si nuclear magnetic resonance spectrum of the particles exhibits a ratio T2:T3 of about 0.4 or more, wherein T2 is the integrated area of the resonance signal with chemical shifts in the range from −56.5 ppm to −58.5 ppm, and wherein T3 is the integrated area of the resonance signal with chemical shifts in the range from −66.0 ppm to −68.0 ppm.

The invention further provides hydrophobic surface-treated silica particles having (1) a ratio T2:T3 of about 0.4 or more, wherein T2 is the intensity of a peak having a chemical shift in the CP/MAS $^{29}$Si NMR spectrum centered within the range of −56 ppm to −59 ppm, and wherein T3 is the intensity of a peak having a chemical shift in the CP/MAS $^{29}$Si NMR spectrum centered within the range of −65 ppm to −69 ppm, and (2) a ratio (T2+T3)/(T2+T3+M) of greater than about 0.05, wherein M is the intensity of a peak having a chemical shift in the CP/MAS $^{29}$Si NMR spectrum centered within the range of +7 ppm to +18 ppm.

BRIEF DESCRIPTION OF THE DRAWING

The FIGURE is a graph that illustrates the particle size distribution for the product of Example 3.

DETAILED DESCRIPTION OF THE INVENTION

The invention provides a method of preparing hydrophobic silica particles. The method comprises (a) providing an acidic aqueous dispersion of silica, (b) combining the dispersion with a trialkoxysilane compound to provide a reaction mixture, and (c) drying the reaction mixture to provide hydrophobic silica particles.

The acidic aqueous dispersion of silica can comprise any suitable type of silica particles, provided that the silica particles have an average particle size of about 1000 nm or less, e.g., about 5 nm to about 1000 nm. The particle size refers to the diameter of the smallest sphere that encloses the particle. Preferably, the silica particles comprise discrete particles of amorphous silica. The acidic aqueous dispersion of silica can have any suitable pH and typically will have a pH of about 2 to about 7.

The acidic aqueous dispersion of silica preferably is colloidally stable. The colloidal stability of the dispersion prevents any substantial portion of the particles from irreversibly agglomerating or gelling, or from settling out of the dispersion during use. The acidic aqueous dispersion of silica used in conjunction with the invention preferably has a degree of colloidal stability such that the average overall particle size of the silica in dispersion, as measured by dynamic light scattering, does not change over a period of 1 hour or more (e.g., about 8 hours or more, or about 24 weeks or more), more preferably 2 weeks or more (e.g., about 4 weeks or more, or about 6 weeks or more), most preferably 8 weeks or more (e.g., about 10 weeks or more, or about 12 weeks or more), or even about even 16 weeks or more.

The acidic aqueous dispersion of silica can be prepared by any process capable of producing an acidic aqueous silica dispersion as characterized herein. The acidic aqueous dispersion of silica can comprise silica particles of any type or source. Preferably, the silica particles are selected from the group consisting of wet-process type silica particles and pyrogenic silica particles.

Wet-process type silica particles include silica particles prepared via solution-phase processes. Suitable wet-process type silica particles include silica sol made from alkali metal silicates and condensation-polymerized silica particles made from any starting material including, but not limited to, chlorosilanes and alkoxysilanes such as tetraethoxysilane. Preferably, the condensation-polymerized silica comprises a silica sol. The term silica sol is derived from silicic acid sol, or more accurately silicic acid aquasol. Silica sols are colloidal dispersions of silicic acid in water and comprise amorphous silica particles with particle sizes in the range of about 5 nm to about 1000 nm.

In a first embodiment, the acidic aqueous dispersion of silica is prepared by the acidification of an alkali metal silicate solution to a pH of about 9 to about 11, wherein the silicate anions provided by the alkali metal silicate undergo polymerization to produce discrete silica particles having the desired average particle size in the form of an aqueous dispersion. The alkali metal cation can be sodium or potassium. The free alkali metal cation content of the base-stabilized dispersion of silica then can be reduced by treatment of the aqueous colloidal dispersion with an acidic ion exchange resin, which treatment also reduces the pH of the dispersion to about 2 to about 7, thereby producing an acidic aqueous dispersion of silica wherein the silica is silica sol. The ion exchange treatment of the basic aqueous dispersion of silica can be performed at any time. For example, the ion exchange treatment of the basic aqueous dispersion of silica can be performed as part of the production process of the acidic aqueous dispersion of silica, so that the acidic aqueous dispersion of silica can be a commercially available product and supplied as such. Alternatively, a commercially available basic aqueous dispersion of silica can be treated with an ion exchange resin shortly before use in the inventive method (e.g., about 1 hour before use, or about 1 day before use, or about 1 week before use). The acidic aqueous dispersion of silica of this embodiment is typically characterized by having a pH of about 2 to about 7 and by having a content of free alkali metal cation of about 0.05 wt. % or less. "Free alkali metal cation" refers to alkali metal cation that is solubilized in the aqueous phase of the dispersion and does not refer to alkali metal cation that may be bound or trapped within the interior of the silica particles and thus inaccessible to the aqueous phase. Non-limiting examples of commercially acidic aqueous dispersions of silica suitable for use in the inventive method include the OL-40, OMP-1040, OYL, ST-O, and ST-OL products from Nissan Chemical and the Levasil 200S/30% and Levasil 200E/20% products from H. C. Starck.

In a second embodiment, the acidic aqueous dispersion of silica is prepared by acidification of a basic aqueous dispersion of silica with a mineral acid or an organic acid to a pH of about 2 to about 7. The acidic aqueous dispersion of silica of this embodiment typically contains free alkali metal cations derived from the alkali metal silicates utilized in the preparation of the precursor basic aqueous silica dispersion, as well as alkali metal cations bound or trapped within the interior of the silica particles.

In a third embodiment, the acidic aqueous dispersion of silica is prepared by dispersing a precipitated silica in an acidic aqueous medium. Typically, precipitated silica is prepared by acidifying an aqueous solution of an alkali metal silicate with a mineral acid. Precipitated silica typically contains free alkali metal cations derived from the alkali metal silicates utilized in the preparation of the precipitated silica, as well as alkali metal cations bound or trapped within the interior of the silica particles. The precipitated silica can be dispersed in water using high-shear mixers and the like. The aqueous dispersion of precipitated silica can be acidified after dispersion of the precipitated silica using a mineral acid or a carboxylic acid, or the water of the aqueous dispersion can be acidified prior to dispersing the precipitated silica.

In a fourth embodiment, the acidic aqueous dispersion of silica comprises pyrogenic silica (i.e., fumed silica). Pyrogenic silica typically is produced by the vapor phase hydrolysis of a silica precursor, such as silicon tetrachloride, dichlorodimethysilane, or octamethylcyclotetrasiloxane, in a hydrogen/oxygen flame, or is produced as the by-product of such a process. In this process, submicron sized molten spheres of silica, known as primary particles, are formed. These particles collide and fuse to form three dimensional, branched, chain-like aggregates that typically are less than 1000 nm in spherical diameter (i.e., the diameter of the smallest sphere encompassing the aggregate). The aggregates can become loosely associated with each other to form agglomerates, which can have particles sizes exceeding 1000 nm in spherical diameter (i.e., the diameter of the smallest sphere encompassing the agglomerate). The agglomerates can be dispersed in aqueous medium using high-energy mixing devices to form colloidally stable dispersions having average particle sizes of about 5 nm to about 1000 nm. The aqueous dispersions of pyrogenic silica particles can be acidified by any method capable of acidifying the aqueous dispersions. For example, pyrogenic silica provided as a dry material can be dispersed in water at a pH of about 2 to about 7 to provide an acidic aqueous dispersion of pyrogenic silica. Acidic aqueous dispersions of pyrogenic silica are commercially available. A non-limiting example of a suitable acidic aqueous dispersion of pyrogenic silica is Cab-O-Sperse PG-022 (Cabot Corp., Boston, Mass.).

The acidic aqueous dispersion of silica typically comprises about 5 wt. % to about 55 wt. % of silica, expressed as the weight percent of $SiO_2$ provided by the acidic aqueous dispersion of silica, based on the total weight of the dispersion.

The silica particles can have any surface area and typically have a surface area of about 10 $m^2$/g to about 500 $m^2$/g (e.g., about 20 $m^2$/g to about 300 $m^2$/g, or about 25 $m^2$/g to about 200 $m^2$/g).

The alkoxysilane compound has the general formula: $R^1_x Si(OR^2)_{4-x}$ wherein $R^1$ is selected from the group consisting of $C_1$-$C_{30}$ branched and straight chain alkyl, aminoalkyl, alkenyl, and aminoalkenyl, $C_3$-$C_{10}$ cycloalkyl, and $C_6$-$C_{10}$ aryl, $R^2$ is $C_1$-$C_{10}$ branched and straight chain alkyl, and x is an integer of 1-3. Examples of suitable alkoxylsilane compounds include but are not limited to trimethylmethoxysilane, dimethyldimethoxysilane, methyltrimethoxysilane, and the like.

Preferably, the alkoxysilane compound is a trialkoxysilane compound. The trialkoxysilane compound can be any suitable trialkoxysilane. For example, the trialkoxysilane compound can have the formula: $R^1 Si(OR^2)_3$ wherein $R^1$ is selected from the group consisting of $C_1$-$C_{30}$ branched and straight chain alkyl, aminoalkyl, alkenyl, and aminoalkenyl, and $C_3$-$C_{10}$ cycloalkyl, and $R^2$ is $C_1$-$C_{10}$ branched and straight chain alkyl. Preferably, the trialkoxysilane compound is selected from the group consisting of methyltrimethoxysilane, ethyltrimethoxysilane, propyltrimethoxysilane, butyltrimethoxysilane, pentyltrimethoxysilane, hexyltrimethoxysilane, heptyltrimethoxysilane, octyltrimethoxysilane, nonyltrimethoxysilane, decyltrimethoxysilane, undecyltrimethoxysilane, dodecyltrimethoxysilane, tetradecyltrimethoxysilane, stearyltrimethoxysilane, methyltriethoxysilane, ethyltriethoxysilane, propyltriethoxysilane, butyltriethoxysilane, pentyltriethoxysilane, hexyltriethoxysilane, heptyltriethoxysilane, octyltriethoxysilane, nonyltriethoxysilane, decyltriethoxysilane, undecyltriethoxysilane, dodecyltriethoxysilane, tetradecyltriethoxysilane, stearyltriethoxysilane, and combinations thereof. More preferably, the trialkoxysilane compound is selected from the group consisting of hexyltrimethoxysilane, heptyltrimethoxysilane, octyltrimethoxysilane, nonyltrimethoxysilane, decyltrimethoxysilane, undecyltrimethoxysilane, dodecyltrimethoxysilane, tetradecyltrimethoxysilane, stearyltrimethoxysilane, methyltriethoxysilane, ethyltriethoxysilane, propyltriethoxysilane, butyltriethoxysilane, pentyltriethoxysilane, hexyltriethoxysilane, heptyltriethoxysilane, octyltriethoxysilane, nonyltriethoxysilane, decyltriethoxysilane, undecyltriethoxysilane, dodecyltriethoxysilane, tetradecyltriethoxysilane, stearyltriethoxysilane, 3-aminopropyltriethoxysilane, 3-aminobutyltriethoxysilane, 3-aminobutyltriethoxysilane, and combinations thereof.

When the dispersion is combined with the trialkoxysilane compound to provide a reaction mixture, desirably the dispersion also is combined with an organic solvent.

The organic solvent can be any suitable organic solvent. Preferably, the organic solvent is water-soluble or water-miscible. More preferably, the organic solvent is water-soluble. Non-limiting examples of suitable organic solvents include alcohols (e.g., methanol, ethanol, n-propanol, 2-propanol, n-butanol, isobutanol, sec-butanol, tert-butanol, n-propanol, ethylene glycol, and propylene glycol), ketones (e.g., acetone and 2-butanone), and ethers (e.g., tetrahydrofuran and 1,2-dimethoxyethane). Typically, the reaction mixture will comprise no more than about 50 wt. % of organic solvent, and preferably will comprise not more than about 40 wt. % of organic solvent.

The acidic aqueous dispersion of silica optionally is treated with a compound selected from the group consisting of a silazane, ammonia, and an amine. The silazane can be any suitable silazane and can be a (mono)silazane or a disilazane. Preferably, the silazane is hexamethyldisilazane or a cyclic silazane. The cyclic silazane has the general formula has the general formula

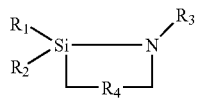

wherein $R^1$ and $R_2$ are independently selected from the group consisting of hydrogen, halogen, alkyl, alkoxy, aryl, and aryloxy; $R_3$ is selected from the group consisting of hydrogen, $(CH_2)_n CH_3$, wherein n is an integer between 0 and 3, $C(O)(CH_2)_n CH_3$, wherein n is an integer between 0 and 3, $C(O)NH_2$, $C(O)NH(CH_2)_n CH_3$, wherein n is an integer between 0 and 3, and $C(O)N[(CH_2)_n CH_3](CH_2)_m CH_3$, wherein n and m are integers between 0 and 3; and $R_4$ is $[(CH_2)_a(CHX)_b, (CYZ)_c]$, wherein X, Y and Z are independently selected from the group consisting of hydrogen, halogen, alkyl, alkoxy, aryl, and aryloxy, and a, b, and c are integers of 0 to 6 satisfying the condition that (a+b+c) equals an integer of 2 to 6. Suitable cyclic silazanes, and methods of preparing cyclic silazanes, are described in U.S. Pat. No. 5,989,768.

The ammonia desirably is an aqueous solution of ammonia (i.e., ammonium hydroxide).

The amine can be any suitable amine. For example, the amine can be a primary amine, a secondary amine, or tertiary amine. Preferably, the amine has a molecular weight of about 400 Daltons or less.

The reaction mixture can be contained in an open or closed reactor. While the reaction mixture can be maintained in an atmosphere of air, oxygen can be excluded from the reaction atmosphere, in which event the reaction mixture can be maintained under an atmosphere consisting essentially of nitrogen, argon, or a mixture thereof.

The step of combining the dispersion with the trialkoxysilane compound and optionally the organic solvent to provide a reaction mixture can comprise (1) combining the dispersion with an alkoxysilane compound and optionally the organic solvent to provide a first reaction mixture, and (2) adding a compound selected from the group consisting of a silazane, ammonia, and an amine, to the first reaction mixture to provide a second reaction mixture. Alternatively, the step of combining the dispersion with the trialkoxysilane compound and optionally the organic solvent to provide a reaction mixture can comprise (1) combining the dispersion with a compound selected from the group consisting of a silazane, ammonia, and an amine, to provide a first reaction mixture, and (2) adding an alkoxysilane compound and optionally an organic solvent to the first reaction mixture to provide a second reaction mixture.

The inventive method can be conducted in a variety of ways.

In one embodiment, the acidic aqueous dispersion of silica is combined with the alkoxysilane compound and the organic solvent to provide a reaction mixture. The reaction mixture can be maintained at any temperature that allows the alkoxysilane compound to react with the acidic aqueous dispersion of silica (e.g., react with the silanol groups on the surface of the silica particles). Generally, the reaction mixture is maintained at a temperature of about 20° C. to about 100° C. (e.g., about 30° C. to about 70° C.) for about 5 minutes or longer (e.g., about 30 minutes or longer), or even about 60 minutes or longer (e.g., about 120 minutes or longer, or about 180 minutes or longer). Longer reaction times (e.g., 5 hours or more, 10 hours or more, or even 20 hours or more) may be required depending on the particular reaction conditions (e.g., temperature and concentration of reagents).

In another embodiment, the acidic aqueous dispersion of silica is combined with the alkoxysilane compound and the organic solvent to provide a first reaction mixture. The first reaction mixture can be maintained at any temperature that allows the alkoxysilane compound to react with the acidic aqueous dispersion of silica as described herein. The first reaction mixture can be maintained at a temperature for a sufficient length of time to allow the silica to react completely, or to any extent desired, with the alkoxysilane compound. Generally, the reaction mixture is maintained at a temperature of about 20° C. to about 100° C. (e.g., about 30° C. to about 70° C.) for about 5 minutes or longer (e.g., about 30 minutes or longer), or even about 60 minutes or longer (e.g., about 120 minutes or longer, or about 180 minutes or longer). Longer reaction times (e.g., 5 hours or more, 10 hours or more, or even 20 hours or more) may be required depending on the particular reaction conditions (e.g., temperature and concentration of reagents).

After a period of time, a compound selected from the group consisting of a silazane, ammonia, and an amine is added to the first reaction mixture to provide a second reaction mixture. When the compound is ammonia or an amine, the ammonia or amine acts as a base to increase the pH of the second reaction mixture. When the compound is a silazane, the silazane can react with surface hydroxyl groups on the silica to transfer silyl groups to the silica surface and to produce ammonia or an amine, as a byproduct. The liberated ammonia and/or amine then acts as a base to increase the pH of the second reaction mixture.

Desirably, the pH of the second reaction mixture is about 2 or more (e.g., about 3 or more). Preferably, the pH of the second reaction mixture is about 9 or less (e.g., about 8 or less, or about 7 or less). More preferably, the pH of the second reaction mixture is about 3 to about 7.

Generally, the second reaction mixture is maintained at a temperature of about 20° C. to about 100° C. (e.g., about 40° C. to about 90° C.) for about 5 minutes or longer (e.g., about 30 minutes or longer), or even about 60 minutes or longer (e.g., about 120 minutes or longer, or about 180 minutes or longer). Longer reaction times (e.g., 5 hours or more, 10 hours or more, or even 20 hours or more) may be required depending on the particular reaction conditions (e.g., temperature and concentration of reagents).

In yet another embodiment, the acidic aqueous dispersion of silica is combined with a compound selected from the group consisting of a silazane, ammonia, and an amine, to provide a first reaction mixture. Generally, the first reaction mixture is maintained at a temperature of about 20° C. to about 100° C. (e.g., about 30° C. to about 70° C.) for about 5 minutes or longer (e.g., about 30 minutes or longer), or even about 60 minutes or longer (e.g., about 120 minutes or longer, or about 180 minutes or longer). Longer reaction times (e.g., 5 hours or more, 10 hours or more, or even 20 hours or more) may be required depending on the particular reaction conditions (e.g., temperature and concentration of reagents). After a period of time, an alkoxysilane compound and an organic solvent is added to the first reaction mixture to provide a second reaction mixture. Generally, the second reaction mixture is maintained at a temperature of about 20° C. to about 100° C. (e.g., about 30° C. to about 70° C.) for about 5 minutes or longer (e.g., about 30 minutes or longer), or even about 60 minutes or longer (e.g., about 120 minutes or longer, or about 180 minutes or longer). Longer reaction times (e.g., 5 hours or more, 10 hours or more, or even 20 hours or more) may be required depending on the particular reaction conditions (e.g., temperature and concentration of reagents).

Desirably, the pH of the first reaction mixture is about 2 or more (e.g., about 3 or more). Preferably, the pH of the first reaction mixture is about 9 or less (e.g., about 8 or less, or about 7 or less). More preferably, the pH of the first reaction mixture is about 3 to about 7.

In still another embodiment, the acidic aqueous dispersion of silica is combined simultaneously, or nearly simultaneously, with the alkoxysilane compound, organic solvent, and a compound selected from the group consisting of a silazane, ammonia, and an amine to provide a reaction mixture. The components can be combined simultaneously, or each of the components can be added stepwise to a reaction vessel containing the acidic aqueous dispersion of silica so that not more than 5 minutes (e.g., not more than 10 minutes, or not more than 30 minutes) elapses between addition of any two components. When the components are combined simultaneously, typically the combination of components to provide a reaction mixture is performed at ambient temperature, after which combination the reaction mixture is typically maintained at a temperature as described herein.

In a further embodiment, the acidic aqueous dispersion of silica is first combined with a compound selected from the group consisting of aluminum salts, zirconium salts, and combinations thereof prior to treatment with a trialkoxysilane compound or a compound selected from the group consisting of a silazane, ammonia, and an amine. Without wishing to be bound by any particular theory, it is believed that the aluminum and/or zirconium salt binds to a portion of the surface of the silica particles. Advantageously, the presence of an aluminum and/or zirconium salt alters the surface charge of the silica particles. Alteration of the surface charge of the silica particles is expected to affect properties of compositions comprising the silica particles. For example, the tribocharge of toner particles comprising the inventive silica particles is expected to change due to the presence of aluminum and/or zirconium salts on the surface of the silica particles. Typically, the amount of aluminum and/or zirconium salt is selected to provide a surface coverage of about 1 to about 5 molecules of aluminum and/or zirconium salt per $nm^2$ of the silica particles. The desired surface coverage of aluminum and/or zirconium salt can be achieved by any suitable means, such as by using about 10 mg to about 100 mg of the aluminum and/or zirconium salt based on the weight of silica contained in the acidic aqueous dispersion of silica. Preferably, the aluminum and zirconium salts are selected from the group consisting of aluminum halides, aluminum hydroxy halides, zirconyl oxyhalides, zirconyl hydroxyhalides, and mixtures thereof.

Preferred aluminum salts are those having the general formula $Al_2(OH)_{6-a}X_a$ wherein X is Cl, Br, I or $NO_3$, and a is about 0.3 to about 5, preferably about 1 to 2, such that the Al to X mole ratio is about 1:1 to 2.1:1. These salts generally have some water of hydration associated with them, typically on the order of 1 to 6 moles per mole of salt. Most preferably, the aluminum salt is aluminum chlorohydrate (i.e., X is Cl), and a is about 1, such that the aluminum to chlorine mole ratio is about 1.9:1 to 2.1:1.

Preferred zirconium salts are those having the general formula $ZrO(OH)_{2-pb}Y_b$ wherein Y is Cl, Br, I, $NO_3$, or $SO_4$, b is about 0.8 to 2, and p is the valence of Y. The zirconium salts also generally have some water of hydration associated with them, typically on the order of 1 to 7 moles per mole of salt. Preferably the zirconium salt is zirconyl hydroxychloride of the formula $ZrO(OH)_{2-b}Cl_b$ wherein b is about 1 to 2, preferably about 1.2 to about 1.9.

Advantageously, surface treatment of an aqueous acidic dispersion of silica with aluminum halides, aluminum hydroxy halides, zirconyl oxyhalides, zirconyl hydroxyhalides, and mixtures thereof, provides a colloidally stable dispersion of surface-treated silica having a particle size distribution substantially the same as that of the starting acidic aqueous dispersion of silica. By way of contrast, treatment of conventional base-stabilized dispersions of silica with aluminum halides, aluminum hydroxy halides, zirconyl oxyhalides, zirconyl hydroxyhalides, and mixtures thereof, results in production of an immobile, paste-like material.

The surface treatment of the acidic aqueous dispersion of silica resulting from practice of the inventive method generates various patterns of substituted silicon atoms attached to the surface of the silica particles or attached indirectly to the surface of the silica particles. These substitution patterns have been referred to in the literature as M sites, D sites, T sites, and Q sites. See, for example, Sindorf, Dean William, "Silicon-29 and Carbon-13 CP/MAS NMR Studies of Silica Gel and Bonded Silane Phases," Department of Chemistry, Colorado State University, Fort Collins, Colo., 1982. The correlation of the M sites, D sites, T sites, and Q sites to the resonance signals in the CP/MAS $^{29}$Si NMR spectrum also is discussed in Maciel, G., Sindorf, D. W., *J. Am. Chem. Soc.* 102:7607-7608 (1980), Sindorf, D. W., Maciel, G., *J. Phys. Chem.*, 86: 5208-5219 (1982), and Sindorf, D. W., Maciel, G., *J. Am. Chem. Soc.*, 105: 3767-3776 (1983).

In particular, the surface treatment of an acidic aqueous dispersion of silica with a trialkoxysilane compound in accordance with one embodiment of the method of the invention provides silica particles having predominantly substitution patterns referred to as T2 and T3 sites as well as having M sites. As used herein, T2 sites correspond to a silicon atom originating from the trialkoxysilane compound having two bonds to oxygen atoms further bonded to silicon atoms, at least one of which is on the silica surface, one bond to an oxygen atom comprising a silanol (Si—OH) group, and one bond to a carbon atom. T2 sites are represented by formula (I): R—Si(OH)—(OSi—$P^1$)(OSi$P^2$) wherein the group R is as defined herein for the trialkoxysilane compound, and $P^1$ and $P^2$ independently represent a bond to a silicon atom on a particle surface and/or a silicon atom of another silane-containing molecule. Si atoms corresponding to T2 sites have been correlated with the resonance signals with chemical shifts in the range from −56.5 ppm to −58.5 ppm in the CP/MAS $^{29}$Si NMR spectrum, wherein the chemical shift in ppm is measured relative to the standard tetramethylsilane.

As used herein, T3 sites correspond to a silicon atom originating from the trialkoxysilane compound having three bonds to an oxygen atom further bonded to silicon atoms. At least one of the silicoan atoms is a silicon atom on a particle. The sites are represented by the formula (II): R—Si(OSi—P$^1$)(OSi—P$^2$)(OSi—P$^3$) wherein the grouop R is as herein defined for the trialkoxysilane compound and wherein P$^1$, P$^2$, and P$^3$ independently represent a bond to a silicon atom on a particle surface and/or a silicon atom of another silane-containing molecule. Si atoms corresponding to T3 sites have been correlated with the resonance signals with chemical shifts in the range from −66.0 ppm to −68.0 ppm in the CP/MAS $^{29}$Si NMR spectrum, wherein the chemical shift in ppm is measured relative to the standard tetramethylsilane.

As used herein, M sites correspond to a silicon atom originating from a silazane compound having three bonds to a carbon atom and one bond to an oxygen atom further bonded to a silicon atom which in turn is bonded to a surface functional group of a silica particle, upon reaction with the surface of the silica particle. M sites are represented by formula (III): R$^1$R$^2$R$^3$—Si—OP wherein R$^1$, R$^2$, and R$^3$ are $C_1$-$C_{10}$ groups bonded to the silicon atoms in the silazane compound. Si atoms corresponding to M sites have been correlated with the resonance signals with chemical shifts in the range from +7 ppm to +18 ppm in the CP/MAS $^{29}$Si NMR spectrum, wherein the chemical shift in ppm is measured relative to the standard tetramethylsilane.

As defined herein, T2 is the intensity of a peak having a chemical shift in the CP/MAS $^{29}$Si NMR spectrum centered within the range of −56 ppm to −59 ppm. T3 is the intensity of a peak having a chemical shift in the CP/MAS $^{29}$Si NMR spectrum centered within the range of −65 ppm to −69 ppm. M is the intensity of a peak having a chemical shift in the CP/MAS $^{29}$Si NMR spectrum centered within the range of +7 ppm to +18 ppm. The intensity of a peak refers to the maximum peak height of the signal at that approximate location or the area of the peak occurring within the recited ranges, as calculated using standard calculation methods well known to those skilled in the art.

The hydrophobic silica particles of the invention have a ratio of T2 to T3 (i.e., T2:T3) of about 0.4 or more (e.g., about 0.45 or more), wherein T2 and T3 are as defined herein. The parameters T2, T3, and M of the hydrophobic silica particles of the invention also satisfy the formula: (T2+T3)/(T2+T3+M)≧0.05.

The ratio T2:T3 depends, at least in part, on the particular reaction conditions employed in the preparation of the hydrophobic silica particles. Reaction of an acidic aqueous dispersion of silica with a trialkoxysilane compound in the absence of a base and without subsequent treatment with a silazane compound, ammonia, or an amine provides hydrophobic silica particles having a ratio (T2:T3)$_1$. Reaction of an acidic aqueous dispersion of silica with a trialkoxysilane compound followed by treatment with a silazane compound, ammonia, or an amine provides hydrophobic silica particles having a ratio (T2:T3)$_2$, wherein generally (T2:T3)$_2$<(T2:T3)$_1$. Treatment of an acidic aqueous dispersion of silica with a silazane compound, ammonia, or an amine a trialkoxysilane compound followed by treatment with a trialkoxysilane compound provides hydrophobic silica particles having a ratio (T2:T3)$_3$, wherein generally (T2:T3)$_3$<(T2:T3)$_1$. Thus, the ratio T2:T3 can be controlled to some extent by selection of the particular method used to prepare the hydrophobic silica particles, such as, in particular, by varying the amount of a silazane compound, ammonia, or an amine in the preparation of the hydrophobic silica particles, wherein the amount can be zero, or substantially zero. Further, the ratio T2:T3 can be controlled when employing a silazane compound, ammonia, or an amine by control of the amount of the silazane compound, ammonia, or an amine used, by control of reaction temperatures, and by control of reaction times.

The hydrophobic silica particles preferably are isolated from the reaction mixture by drying the reaction mixture to provide the hydrophobic silica particles. The drying of the reaction mixture can be effected in any suitable manner. For example, spray drying can be used to dry the hydrophobic silica particles. Spray drying involves spraying the reaction mixture, or some portion thereof, comprising the hydrophobic silica particles as a fine mist into a drying chamber, wherein the fine mist is contacted with hot air causing the evaporation of volatile components of the reaction mixture. The temperature chosen for the hot air will depend, at least in part, on the specific components of the reaction mixture that require evaporation. Typically, the drying temperature will be about 40° C. or higher (e.g., about 50° C. or higher) such as about 70° C. or higher (e.g., about 80° C. or higher) or even about 120° C. or higher (e.g., about 130° C. or higher). Thus, the drying temperatures fall generally within the range of about 40-250° C. (e.g., about 50-200° C.), such as about 60-200° C. (e.g., about 70-175° C.), or about 80-150° C. (e.g., about 90-130° C.).

The hydrophobic silica particles can be isolated from the reaction mixture prior to drying, or the hydrophobic silica particles can be dried directly from the reaction mixture. Any suitable method can be used to isolate the hydrophobic silica particles from the reaction mixture. Suitable methods include filtration and centrifugation.

The hydrophobic silica particles can be dried after isolation from the reaction mixture, or directly from the reaction mixture, by evaporating the volatile components of the reaction mixture from the hydrophobic silica particles. Evaporation of the volatile components of the reaction mixture can be accomplished using any suitable techniques, e.g., heat and/or reduced atmospheric pressure. When heat is used, the hydrophobic silica particles can be heated to any suitable drying temperature, for example, by using an oven or other similar device. The temperature can be as recited for the spray drying embodiment of the invention.

The hydrophobic silica particles can be dried at any pressure that will provide a useful rate of evaporation. When drying temperatures of about 120° C. and higher (e.g., about 120-150° C.) are used, drying pressures of about 125 kPa or less (e.g., about 75-125 kPa) are suitable. At drying temperatures lower than about 120° C. (e.g., about 40-120° C.), drying pressures of about 100 kPa or less (e.g., about 75 kPa or less) are useful. Of course, reduced pressure (e.g., pressures of about 100 kPa or less, 75 kPa or less, or even 50 kPa or less) can be used as a sole method for evaporating the volatile components of the reaction mixture.

Alternatively, the hydrophobic silica particles can be dried by lyophilization, wherein the liquid components of the reaction mixture are converted to a solid phase (i.e., frozen) and then to a gas phase by the application of a vacuum. For example, the reaction mixture comprising the hydrophobic silica particles can be brought to a suitable temperature (e.g., about −20° C. or less, or about −10° C. or less, or even −5° C. or less) to freeze the liquid components of the reaction mixture, and a vacuum can be applied to evaporate those components of the reaction mixture to provide dry hydrophobic silica particles.

The hydrophobic silica particles can be washed prior to or after isolation and/or drying from the reaction mixture. Washing the hydrophobic silica particles can be performed using a suitable washing solvent, such as water, a water-miscible organic solvent, a water-immiscible solvent, or a mixture thereof. The washing solvent can be added to the reaction mixture and the resulting mixture suitably mixed, followed by filtration, centrifugation, or drying to isolate the washed hydrophobic silica particles. Alternatively, the hydrophobic silica particles can be isolated from the reaction mixture prior to washing. The washed hydrophobic silica particles can be further washed with additional washing steps followed by additional filtration, centrifugation, and/or drying steps.

The hydrophobic silica particles have an overall particle size that is dependent, at least in part, on the overall particle size of the silica in the initial dispersion. Preferably, the average overall particle size of the hydrophobic silica particles is about five times or less, more preferably about two times or less, the average overall particle size of the silica in the initial dispersion. When even smaller particles are desired, the average overall particle size of the hydrophobic silica particles is desirably about 175% or less, such as about 150% or less or even 125% or less, of the average overall particle size of the silica particles in the initial dispersion. The average overall particle size of the hydrophobic silica particles can be determined by any suitable method, such as dynamic light scattering, many of which methods are known in the art. The particle size of the hydrophobic silica particles can be further reduced, if desired. Suitable processes for the reduction of the particle size of the hydrophobic silica particles include but are not limited to wet or dry grinding, hammer milling, and jet milling.

The hydrophobic silica particles can be used for many different applications including but not limited to toner compositions, antiblocking agents, adhesion modifiers, polymer additives (e.g., for elastomers and rubbers, such as silicone rubbers), abrasion-resistant coatings and films, delustering coatings and films, reological control agents (e.g., for epoxies or liquid polymers), and mechanical/optical control agents (e.g., for composites and plastics). The hydrophobic silica particles are especially useful in toner compositions. In that regard, the invention provides a method for preparing a toner composition, as well as a method of preparing a polymer composition, which methods comprise (a) preparing hydrophobic silica particles according to the methods described herein and (b) combining the hydrophobic silica particles with toner particles or a polymer to provide a toner composition or polymer composition, respectively.

The following examples further illustrate the invention but, of course, should not be construed as in any way limiting its scope.

All examples of surface-treated metal oxides were characterized by carbon content and $^{29}$Si NMR. Carbon content was measured using LECO C-200 carbon analyzer.

Solid-state $^{29}$Si cross-polarization magic-angle spinning (CP/MAS) NMR spectra were recorded at 9.4 T (79.49 MHz for $^{29}$Si and 400.19 MHz for $^{1}$H) using a Bruker Avance II-400 spectrometer with a 4-mm double resonance MAS probe. Linear ramp of proton channel RF amplitude from 70% to 100% during the cross-polarization contact time was used for achieving good and stable Hartmann-Hahn matching condition at the magic angle spinning speed of 8 kHz. The $^{29}$Si RF field optimized for the Hartmann-Hahn match is 49 KHz. The contact time for $^{29}$Si CP/MAS measurements were set as 10 ms. Composite pulse proton decoupling (TPPM) with a field strength of 42 kHz was applied during the data acquisition period. Typically, 2000 repeated scans with a recycle delay of 3 seconds were used to acquire the data. All of the NMR measurements were performed at room temperature. The $^{29}$Si chemical shifts are referenced to tetramethylsilane using an external standard of tris(trimethylsilyl)silane.

Example 1

To 40 kg of an acidic aqueous dispersion of silica having a pH of about 3 (OMP-1040, obtained from Nissan Chemical) in a reactor was added 27.8 kg of 2-propanol and then 1.84 kg of octyltriethoxysilane. The resulting mixture was stirred rapidly with an overhead paddle stirrer and was simultaneously circulated through a homogenizer while heating to 70° C. and maintained for 6 h. 3.8 kg of a 3.43 wt. % aqueous solution of ammonium hydroxide was added to the reaction mixture, and the mixture was stirred at 70° C. for an additional 2.5 h. The reaction mixture was then spray dried at a temperature of 135° C. to provide hydrophobic silica particles as a dry powder. The carbon content of the silica particles was 4.28 wt. %. The T2/T3 ratio was 0.48.

Example 2

To 41 kg of an acidic aqueous dispersion of silica having a pH of about 3 (OYL, obtained from Nissan Chemical) in a reactor was added 28.7 kg of 2-propanol and then 1.87 kg of octyltriethoxysilane. The resulting mixture was stirred rapidly with an overhead paddle stirrer and was simultaneously circulated through a homogenizer while heating to 68° C. and so maintained for 7.5 h. The reaction mixture was then spray dried at a temperature of 130° C. to provide hydrophobic silica particles as a dry powder. The carbon content of the silica particles was 4.8 wt. %. The T2/T3 ratio was 1.45.

Example 3

To 39 kg of an acidic aqueous dispersion of silica having a pH of about 3 (OYL, obtained from Nissan Chemical) in a reactor was added 20.7 kg of deionized water and then 2.51 kg of hexamethyldisilazane. The resulting mixture was stirred rapidly with an overhead paddle stirrer and was simultaneously circulated through a homogenizer while heating to 50° C. and so maintained for 6 h. Approximately 28 L of the reaction mixture was removed and reserved for another purpose. To the remaining reaction mixture was added 24.6 kg of 2-propanol and then 0.61 kg of octyltriethoxysilane. Reaction was continued at 70° C. for 5.8 h. The reaction mixture was then spray dried at 125° C. to provide hydrophobic silica particles as a dry powder. The carbon content of the silica particles was 2.32 wt. %. The T2/T3 ratio was 0.51. The particle size distribution is shown in the FIGURE.

Example 4

To 107 g of colloidal silica dispersion (pH~3) (Nissan Chemical Snowtex OYL) in a round bottom glass flask was added 47 g deionized water to provide a 20% solids dispersion. To the dispersion was added 2.8 g hexamethyldisilazane. The mixture was stirred vigorously with an overhead stirrer while heating to 50° C. and so maintained for 4 hr. The mixture was allowed to cool to room temperature and the head space of the flask was purged with nitrogen gas for 10 hr. Subsequently, 0.59 g of 3-aminopropyltriethoxysilane was added to the reaction mixture, and the reaction mixture was stirred vigorously with an overhead stirrer while heating to 50° C. and so maintained for 4 hr under an ambient air atmosphere. The mixture was then poured into a glass beaker and dried at 130° C. for 8 hr. The resulting dry solid had carbon content of 0.64 wt %.

Example 5

To 107 g of colloidal silica dispersion (pH~3) (Nissan Chemical Snowtex OYL) in a round bottom glass flask was added 47 g deionized water to provide a 20% solids dispersion. To the dispersion was added 0.59 g of 3-aminopropyltriethoxysilane. The mixture was stirred vigorously with an overhead stirrer while heating to 50° C. and so maintained for 4 hr. Subsequently, 2.8 g hexamethyldisilazane was added to the mixture and heating at 50° C. with stirring was continued for an additional 4 hr. The mixture was then poured into a glass beaker and dried at 130° C. for 8 hr. The resulting dry solid had carbon content of 0.62 wt %.

COMPARATIVE EXAMPLE 1

To 42 kg of an basic aqueous dispersion of silica having a pH of about 9.5 (MP-1040, obtained from Nissan Chemical) in a reactor was added 27 kg of 2-propanol and then 1.44 kg of octyltriethoxysilane. The resulting mixture was stirred rapidly with an overhead paddle stirrer and was simultaneously circulated through a homogenizer while heating to 70° C. and so maintained for 7 h. The reaction mixture was then spray dried at 110° C. to provide hydrophobic silica particles as a dry powder. The carbon content of the silica particles was 2.8 wt. %. The T2/T3 ratio was 0.21.

COMPARATIVE EXAMPLE 2

To 41 kg of an basic aqueous dispersion of silica having a pH of about 9.5 (YL, obtained from Nissan Chemical) in a reactor was added 26 kg of 2-propanol and then 1.86 kg of octyltriethoxysilane. The resulting mixture was stirred rapidly with an overhead paddle stirrer and was simultaneously circulated through a homogenizer while heating to 70° C. and so maintained for 7.5 h. The reaction mixture then was spray dried at 135° C. to provide hydrophobic silica particles as a dry powder. The carbon content of the silica particles was 3.7 wt. %. The T2/T3 ratio of the hydrophobic silica particles was 0.21.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of preparing hydrophobic silica particles comprising:
   (a) providing a stable acidic aqueous colloidal dispersion of silica particles, wherein the content of free alkali metal cation in the aqueous dispersion is 0.05 wt. % or less,
   (b) combining the dispersion with an alkoxysilane compound to provide a reaction mixture in aqueous dispersion form, wherein the reaction mixture comprises no more than 40 wt. % of organic solvent, and
   (c) drying the reaction mixture of step (b) to provide hydrophobic silica particles having a ratio T2:T3 of about 0.4 or more, wherein T2 is the intensity of a peak having a chemical shift in the CP/MAS $^{29}$Si NMR spectrum centered within the range of −56 ppm to −59 ppm, and wherein T3 is the intensity of a peak having a chemical shift in the CP/MAS $^{29}$Si NMR spectrum centered within the range of −65 ppm to −69 ppm.

2. The method of claim 1, wherein step (b) comprises:
   (b1) combining the dispersion with an alkoxysilane compound to provide a first reaction mixture in aqueous dispersion form, and
   (b2) adding a compound selected from the group consisting of a silazane, ammonia, and an amine, to the first reaction mixture to provide a second reaction mixture in aqueous dispersion form,
   wherein the first and second reaction mixtures comprise no more than 40 wt. % of organic solvent.

3. The method of claim 2, wherein the alkoxysilane compound is a trialkoxysilane compound.

4. The method of claim 3, wherein step (b1) further comprises combining the dispersion with an organic solvent.

5. The method of claim 4, wherein a silazane is added to the first reaction mixture to provide the second reaction mixture.

6. The method of claim 4, wherein ammonia is added to the first reaction mixture to provide the second reaction mixture.

7. The method of claim 4, wherein an amine selected from the group consisting of primary amines, secondary amines, and tertiary amines, wherein the amine has a molecular weight of about 400 Daltons or less, is added to the first reaction mixture to provide the second reaction mixture.

8. The method of claim 2, wherein the second reaction mixture is maintained at a temperature of about 20° C. to about 100° C.

9. The method of claim 8, wherein the second reaction mixture is maintained at a temperature of about 40° C. to about 90° C.

10. The method of claim 1, wherein step (b) comprises:
(b1) combining the dispersion with a compound selected from the group consisting of a silazane, ammonia, and an amine, to provide a first reaction mixture in aqueous dispersion form, and
(b2) adding an alkoxysilane compound to the first reaction mixture to provide a second reaction mixture in aqueous dispersion than,
wherein the first and second reaction mixtures comprise no more than 40 wt. % of organic solvent.

11. The method of claim 10, wherein the alkoxysilane compound is a trialkoxysilane compound.

12. The method of claim 11, wherein step (b2) further comprises adding an organic solvent to the first reaction mixture to provide the second reaction mixture.

13. The method of claim 10, wherein the dispersion is combined with hexamethyldisilazane or a cyclic silazane to provide the first reaction mixture.

14. The method of claim 10, wherein the dispersion is combined with ammonia to provide the first reaction mixture.

15. The method of claim 10, wherein the dispersion is combined with an amine selected from the group consisting of primary amines, secondary amines, and tertiary amines, wherein the amine has a molecular weight of about 400 Daltons or less, to provide the first reaction mixture.

16. The method of claim 10, wherein the first reaction mixture is maintained at a temperature of about 20° C. to about 100° C.

17. The method of claim 16, wherein the first reaction mixture is maintained at a temperature of about 30° C. to about 70° C.

18. The method of claim 10, wherein, prior to step (c), the method comprises an additional step of substantially removing components having a boiling point of less than about 100° C. from the first reaction mixture.

19. The method of claim 10, wherein the second reaction mixture is maintained at a temperature of about 20° C. to about 100° C.

20. The method of claim 19, wherein the second reaction mixture is maintained at a temperature of about 40° C. to about 90° C.

21. The method of claim 10, wherein the hydrophobic silica particles have a ratio T2:T3 of about 0.45 or more.

22. The method of claim 10, wherein the hydrophobic silica particles have a ratio (T2+T3)/(T2+T3+M) of greater than about 0.05, wherein M is the intensity of a peak having a chemical shift in the CP/MAS $^{29}$Si NMR spectrum centered within the range of +7 ppm to +18 ppm.

23. The method of claim 1, wherein the dispersion is simultaneously combined with an alkoxysilane compound and a compound selected from the group consisting of a silazane, ammonia, and an amine.

24. The method of claim 1, wherein, prior to step (a), an aqueous dispersion of a basic aqueous dispersion of silica is provided and contacted with an ion exchange resin to provide the acidic aqueous dispersion of silica.

25. The method of claim 1, wherein, between steps (a) and (b), the dispersion is combined with a compound selected from the group consisting of aluminum halides, aluminum hydroxy halides, zirconyl oxyhalides, zirconyl hydroxyhalides, and mixtures thereof.

26. The method of claim 1, wherein the hydrophobic silica particles have a ratio T2:T3 of about 0.45 or more.

27. A method of preparing hydrophobic silica particles comprising:
(a) providing a stable acidic aqueous colloidal dispersion of silica particles, wherein the content of free alkali metal cation in the aqueous dispersion is 0.05 wt. % or less,
(b) combining the dispersion with an alkoxysilane compound to provide a reaction mixture in aqueous dispersion form, wherein the reaction mixture comprises no more than 40 wt. % of organic solvent, and
(c) drying the reaction mixture of step (b) to provide hydrophobic silica particles having a ratio (T2+T3)/(T2+T3+M) of greater than about 0.05, wherein T2 is the intensity of a peak having a chemical shift in the CP/MAS $^{29}$Si NMR spectrum centered within the range of −56 ppm to −59 ppm, T3 is the intensity of a peak having a chemical shift in the CP/MAS $^{29}$Si NMR spectrum centered within the range of −65 ppm to −69 ppm, and M is the intensity of a peak having a chemical shift in the CP/MAS $^{29}$Si NMR spectrum centered within the range of +7 ppm to +18 ppm.

28. The method of claim 27, wherein step (b) comprises:
(b1) combining the dispersion with an alkoxysilane compound to provide a first reaction mixture in aqueous dispersion form, and
(b2) adding a compound selected from the group consisting of a silazane, ammonia, and an amine, to the first reaction mixture to provide a second reaction mixture in aqueous dispersion form,
wherein the first and second reaction mixtures comprise no more than 40 wt. % of organic solvent.

29. The method of claim 28, wherein the hydrophobic silica particles have a ratio T2:T3 of about 0.4 or more.

30. The method of claim 27, wherein step (b) comprises:
(b1) combining the dispersion with a compound selected from the group consisting of a silazane, ammonia, and an amine, to provide a first reaction mixture in aqueous dispersion form, and
(b2) adding an alkoxysilane compound to the first reaction mixture to provide a second reaction mixture in aqueous dispersion form,
wherein the first and second reaction mixtures comprise no more than 40 wt. % of organic solvent.

31. The method of claim 27, wherein the hydrophobic silica particles have a ratio T2:T3 of about 0.4 or more.

* * * * *